(12) United States Patent
Schober et al.

(10) Patent No.: US 11,877,256 B2
(45) Date of Patent: Jan. 16, 2024

(54) METHOD AND SYSTEM FOR DETERMINING THE POSITION OF AT LEAST ONE NODE IN A COMMUNICATION NETWORK

(71) Applicant: NXP B.V., Eindhoven (NL)

(72) Inventors: Michael Schober, Graz (AT); Christian Eisendle, Graz (AT); Ghiath Al-kadi, Graz (AT)

(73) Assignee: NXP B.V., Eindhoven (NL)

(*) Notice: Subject to any disclaimer, the term of this patent is extended or adjusted under 35 U.S.C. 154(b) by 217 days.

(21) Appl. No.: 17/458,752

(22) Filed: Aug. 27, 2021

(65) Prior Publication Data
US 2022/0104166 A1 Mar. 31, 2022

(30) Foreign Application Priority Data

Sep. 25, 2020 (EP) ...................................... 20198555

(51) Int. Cl.
*H04W 64/00* (2009.01)
*H04W 56/00* (2009.01)

(52) U.S. Cl.
CPC ....... *H04W 64/00* (2013.01); *H04W 56/0015* (2013.01)

(58) Field of Classification Search
CPC ......... H04W 36/0055; H04W 36/0069; H04W 84/045
USPC ........ 455/458, 436, 456.1, 68, 418, 419, 41, 455/552
See application file for complete search history.

(56) References Cited

U.S. PATENT DOCUMENTS

| | | | | |
|---|---|---|---|---|
| 5,794,141 | A * | 8/1998 | Zicker | H04M 1/72505 455/418 |
| 8,345,588 | B2 * | 1/2013 | Adachi | H04W 48/18 455/552.1 |
| 2006/0066444 | A1 * | 3/2006 | Steeves | G08B 13/1427 340/10.5 |
| 2009/0149198 | A1 | 6/2009 | Nam et al. | |
| 2010/0177681 | A1 | 7/2010 | Sahinoglu | |

(Continued)

FOREIGN PATENT DOCUMENTS

WO WO-2017048779 A1 * 3/2017 ............... G01S 1/20

*Primary Examiner* — Joseph Arevalo

(57) ABSTRACT

In accordance with a first aspect of the present disclosure, a method is conceived for determining the position of at least one node in a communication network, wherein the communication network comprises a localization system that includes a processing unit, a primary anchor and at least one secondary anchor, the method comprising: the primary anchor transmits a poll message to the node and to the secondary anchor; the primary anchor receives a response message from the node; the secondary anchor receives said poll message from the primary anchor and said response message from the node; the processing unit calculates the position of the node using position information and timing information, wherein said position information is position information of the primary anchor and of the secondary anchor, and wherein said timing information is timing information of the poll message transmission by the primary anchor, of the poll message reception by the node and the secondary anchor, of the response message transmission by the node, and of the response message reception by the primary anchor and the secondary anchor.

17 Claims, 8 Drawing Sheets

(56) References Cited

U.S. PATENT DOCUMENTS

| | | | |
|---|---|---|---|
| 2012/0142278 A1* | 6/2012 | Wang | H04W 36/125 455/68 |
| 2015/0055636 A1* | 2/2015 | Rausch | H04W 4/06 370/336 |
| 2016/0139242 A1* | 5/2016 | Dupray | G01S 1/026 455/456.1 |
| 2017/0192085 A1 | 7/2017 | Wagner et al. | |
| 2019/0394748 A1 | 12/2019 | Al-Kadi et al. | |

* cited by examiner

METHOD AND SYSTEM FOR DETERMINING THE POSITION OF AT LEAST ONE NODE IN A COMMUNICATION NETWORK

CROSS-REFERENCE TO RELATED APPLICATIONS

This application claims the priority under 35 U.S.C. § 119 of European Patent application no. 20198555.3, filed on 25 Sep. 2020, the contents of which are incorporated by reference herein.

TECHNICAL FIELD

The present disclosure relates to a method for determining the position of at least one node in a communication network. Furthermore, the present disclosure relates to a corresponding system for determining the position of at least one node in a communication network.

BACKGROUND

UWB communication networks are often used to determine the two-dimensional or three-dimensional position of a node, for example in a building or another structure. In general, the node's position should be determined quickly and accurately, without requiring a lot of processing resources.

SUMMARY

In accordance with a first aspect of the present disclosure, a method is conceived for determining the position of at least one node in a communication network, wherein the communication network comprises a localization system that includes a processing unit, a primary anchor and at least one secondary anchor, the method comprising: the primary anchor transmits a poll message to the node and to the secondary anchor; the primary anchor receives a response message from the node; the secondary anchor receives said poll message from the primary anchor and said response message from the node; the processing unit calculates the position of the node using position information and timing information, wherein said position information is position information of the primary anchor and of the secondary anchor, and wherein said timing information is timing information of the poll message transmission by the primary anchor, of the poll message reception by the node and the secondary anchor, of the response message transmission by the node, and of the response message reception by the primary anchor and the secondary anchor.

In one or more embodiments, the primary anchor further transmits an additional message to the node and to the secondary anchor, wherein said additional message is used for compensating the clock drift occurring between the primary anchor, the secondary anchor and the node.

In one or more embodiments, the communication network is an ultra-wideband communication network.

In one or more embodiments, the timing information comprises timestamps.

In one or more embodiments, the timing information is transmitted to the processing unit through said communication network or through a further communication network, in particular through a ZigBee network, a Bluetooth low energy network, or a Wi-Fi network.

In one or more embodiments, the primary anchor comprises the processing unit.

In one or more embodiments, the method further comprises determining the position of a plurality of nodes in the communication network, wherein the method further comprises selecting an additional primary anchor if at least one of said nodes has not received the poll message, and wherein the additional primary anchor transmits a further poll message to the nodes and to the secondary anchor.

In one or more embodiments, the nodes transmit response messages to the poll message and to the further poll message and said response messages are transmitted in a predetermined order.

In one or more embodiments, said predetermined order is a preconfigured order.

In one or more embodiments, data indicative of said predetermined order is communicated to the nodes through a further communication network, in particular a ZigBee network, a Bluetooth low energy network, or a Wi-Fi network.

In one or more embodiments, the node is kept in a low-power state when no messages are expected to be received.

In one or more embodiments, the localization system further comprises a controller, and wherein said controller controls the primary anchor and the secondary anchor through a further communication network, in particular a ZigBee network, a Bluetooth low energy network, or a Wi-Fi network.

In accordance with a second aspect of the present disclosure, a computer program is provided, comprising executable instructions that, when executed, carry out or control a method of the kind set forth.

In one or more embodiments, a non-transitory computer-readable medium comprises a computer program of the kind set forth.

In accordance with a third aspect of the present disclosure, a localization system is provided for determining the position of at least one node in a communication network, the localization system including a processing unit, a primary anchor and at least one secondary anchor, wherein: the primary anchor is configured to transmit a poll message to the node and to the secondary anchor; the primary anchor is configured to receive a response message from the node; the secondary anchor is configured to receive said poll message from the primary anchor and said response message from the node; the processing unit is configured to calculate the position of the node using position information and timing information, wherein said position information is position information of the primary anchor and of the secondary anchor, and wherein said timing information is timing information of the poll message transmission by the primary anchor, of the poll message reception by the node and the secondary anchor, of the response message transmission by the node, and of the response message reception by the primary anchor and the secondary anchor.

DESCRIPTION OF DRAWINGS

Embodiments will be described in more detail with reference to the appended drawings, in which.

DESCRIPTION OF EMBODIMENTS

As mentioned above, UWB communication networks are often used to determine the two-dimensional or three-dimensional position of a node, for example in a building or another structure. In general, the node's position should be determined quickly and accurately, without requiring a lot of processing resources.

UWB-based indoor position determination systems often use either Two-Way Ranging (TWR) or a Time Difference of Arrival (TDOA) measurement for estimating the position of a node. Although TWR offers a low system complexity and high accuracy, especially when the clock drift is compensated, the processing cost is high, because for every distance measurement two messages should be sent. If a high stability of a position determination system is desired, a high redundancy is needed, which results in a high number of anchors. Since two messages are needed for every distance measurement the number of messages is directly proportional to the number of anchors in a system and directly proportional to the number of nodes. This high number of messages results in a high energy consumption and a reduced number of maximum nodes in the system, due to the limited channel capacity.

Figure 1:
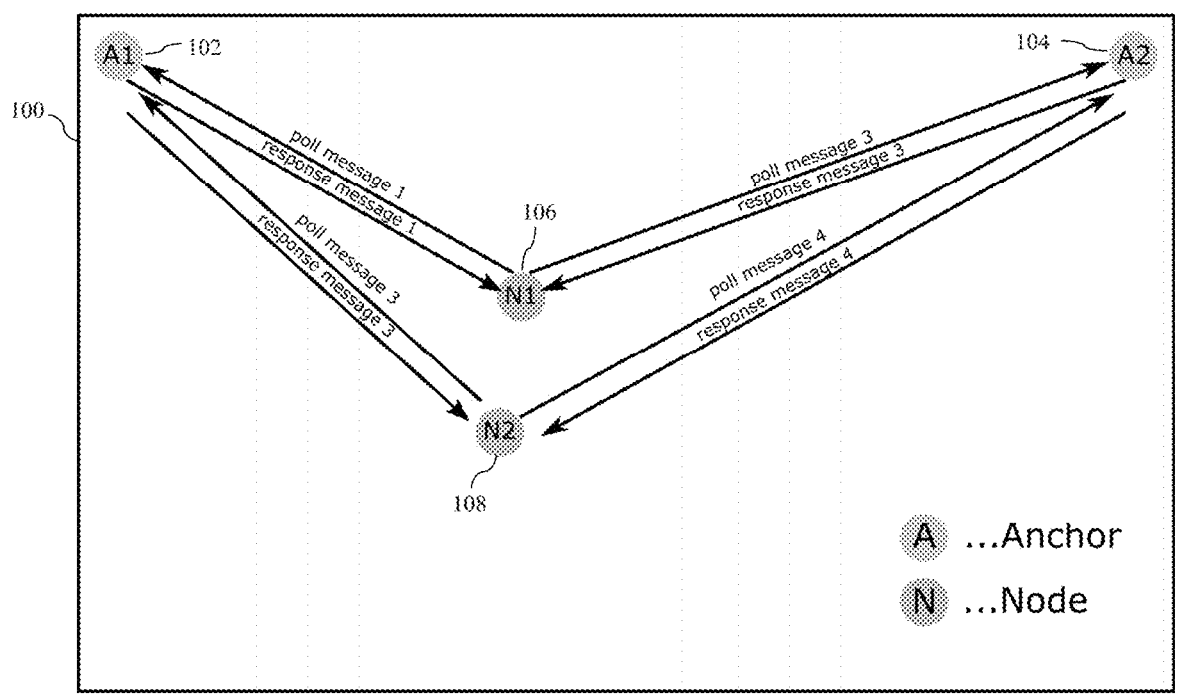
FIG. 1 shows an example of a communication network.

FIG. 1 shows an example of a communication network 100. The communication network 100 comprises a first anchor 102, a second anchor 104, a first node 106 and a second node 108. The first and second anchor node 102, 104 may for example form part of a localization system, which is configured to determine the position of the nodes 106, 108 by causing the first and second anchor 102, 104 to transmit response messages to the nodes 106, 108 after the latter have transmitted poll messages to the anchors 102, 104. The position of the nodes 106, 108 may be determined using timing information of the poll message transmissions, poll message receptions, response message transmissions and response message receptions. In this example, the communication network 100 is an ultra-wideband (UWB) communication network. It is noted that ultra-wideband is a localization technology that uses pulse transmissions over a radio frequency (RF) channel. Because of the high bandwidth requirements for modulating the UWB signal, only a limited number of messages can be transmitted until the maximum channel capacity is reached. Thus, the maximum number of nodes that can be localized is highly dependent on the device localization method and anti-collision method which are used. FIG. 1 shows an example of a so-called Single-Sided Two-Way Ranging (SS-TWR) system, which includes two anchors 102, 104 and two nodes 106, 108. For a SS-TWR ranging session two messages (a poll message and a response message) are needed for estimating the distance between two devices (for example, between a given anchor and a given node).

Figure 2:
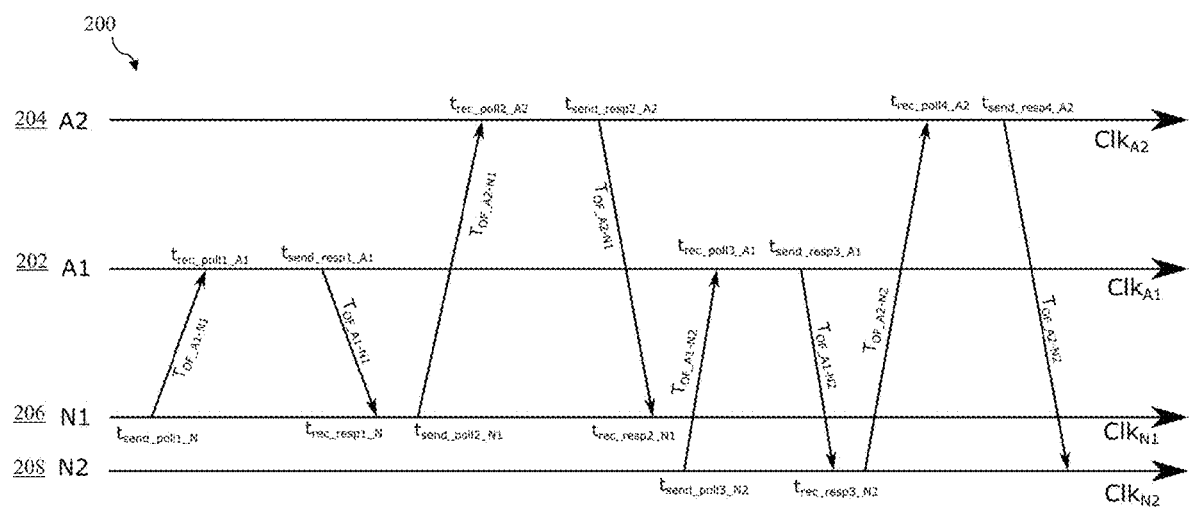
FIG. 2 shows an example of a timing diagram.

FIG. 2 shows an example of a timing diagram 200 of the SS-TWR message exchange in the communication network 100 shown in FIG. 1. Since it is not allowed to transmit two messages at the same time, every ranging should be performed in a different time slot. In total, eight messages are needed for localizing two nodes in a dual-anchor system of the kind set forth. According to FIG. 2, the following timestamps and time of flights are determined:

$t_{rec\_resp2\_N1}$ ... timestamp when the node N1 receives the 2. response message $t_{send\_poll2\_N1}$ ... timestamp when the node N1 sends the 2. poll message $t_{rec\_resp1\_A2}$ ... timestamp when anchor A2 receives the 1. response message $t_{rec\_poll1\_A2}$ ... timestamp when anchor A2 receives the 1. poll message $t_{send\_resp1\_A1}$ ... timestamp when anchor A1 sends the 2. response message $t_{rec\_poll1\_A1}$ ... timestamp when anchor A1 receives the 2. poll message $t_{rec\_resp1\_N1}$ ... timestamp when the node N1 receives the 2. response message $t_{send\_poll1\_N1}$ ... timestamp when the node N1 sends the 2. poll message $T_{OF\_A1-N}$ ... Time of Flight between anchor A1 and the node N $T_{OF\_A2-N}$ ... Time of Flight between anchor A2 and the node N $t_{rec\_resp3\_N2}$ ... timestamp when the node N1 receives the 3. response message $t_{send\_poll3\_N2}$ ... timestamp when the node N1 sends the 3. poll message $t_{rec\_resp4\_A2}$ ... timestamp when anchor A2 receives the 4. response message $t_{rec\_poll4\_A2}$ ... timestamp when anchor A2 receives the 4. poll message $t_{send\_resp3\_A1}$ ... timestamp when anchor A1 sends the 3. response message $t_{rec\_poll3\_A1}$ ... timestamp when anchor A1 receives the 3. poll message $t_{rec\_resp4\_N2}$ ... timestamp when the node N1 receives the 4. response message $t_{send\_poll4\_N2}$ ... timestamp when the node N1 sends the 4. poll message Equation SS-TWR-1 shows how the number of messages that should be transmitted correlates with the number of anchors and number of nodes within a system.

$$number_{of_{messages}} = number_{of_{nodes}} * number_{of_{anchors}} * 2 \quad \text{(Eq. SS-TWR-1)}$$

In a typical localization system, the number of anchors has a linear correlation with the surface of the system. Furthermore, the larger the surface where nodes can be located at, the larger is the number of potential nodes within the system. Thus, the number of nodes has a linear correlation with the surface where the nodes can be tracked and consequently there is also a linear correlation between the number of nodes and the number of anchors within the system, provided that all the nodes should be localized. Equation SS-TWR-2 shows the correlation between the number of nodes and number of anchors in a typical localization system. It is noted that the factor k is a linear correlation factor between the area surface and the required number of anchors.

$$number_{of_{messages}} = number^2_{of_{nodes}} * number_{node_{anchor_{correlation}}} * 2 \quad \text{(Eq. SS-TWR-2)}$$

Since the number of messages that can be transmitted within a given time frame or period is limited, the number of nodes that can be localized with a given localization update frequency is also limited. Especially if SS-TWR with its squared correlation between the number of messages and the number of nodes is applied, the maximum number of nodes that can be localized is significantly reduced. Furthermore, if the nodes are not synchronized, the number of collisions may increase significantly if the number of nodes increases. This collision likelihood also has a large impact on the maximum number of nodes that can be localized.

Figure 3:
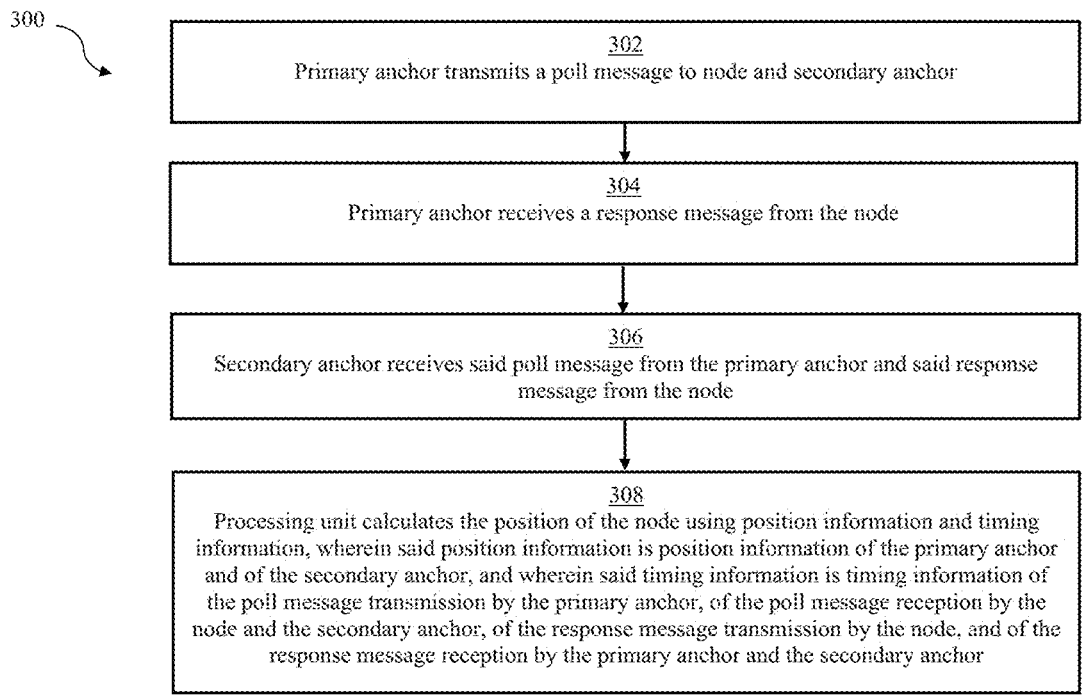
FIG. 3 shows an illustrative embodiment of a method for determining the position of a node.

FIG. 3 shows an illustrative embodiment of a method 300 for determining the position of a node in a communication network. The communication network comprises a localization system that includes a processing unit, a primary anchor and at least one secondary anchor. The localization system should determine the position of the node. The method 300 comprises the following steps. At 302, the primary anchor transmits a poll message to the node and to the secondary anchor. At 304, the primary anchor receives a response message from the node. At 306, the secondary anchor receives said poll message from the primary anchor and said response message from the node. Furthermore, at 308, the processing unit calculates the position of the node using position information and timing information, wherein said position information is position information of the primary anchor and of the secondary anchor, and wherein said timing information is timing information of the poll message transmission by the primary anchor, of the poll message reception by the node and the secondary anchor, of the response message transmission by the node, and of the response message reception by the primary anchor and the secondary anchor. In this way, the node's position may be determined quickly and accurately, without requiring a lot of processing resources. Furthermore, in this way, a relatively large amount of nodes may be localized. In particular, the method 300 may be advantageous in the sense that it has a linear correlation between the number of nodes and the number of messages that need to be transmitted. Additionally, it may offer the possibility of using a slot-based anti-collision scheduling between the messages that are transmitted, which may also have a positive impact on the maximum number of messages that can be transmitted. Thus, the method 300 facilitates increasing the maximum number of nodes that can be localized, due to the reduced number of messages that need to be transmitted. Optionally, a slot-based anti-collision scheme may be applied to further increase the maximum number of nodes that can be localized.

It is noted that the primary anchor may be referred to as a master anchor, while the secondary anchor may be referred to as a slave anchor. Furthermore, it is noted that the position of the primary anchor and the position of the second anchor are known a priori, such that the processing unit may use these positions as input for the aforementioned calculation. In addition, it is noted that, although steps 302, 304 and 306 are shown as separate steps, the operations described in those steps may be executed in parallel. Accordingly, the order of steps shown in FIG. 3 does not imply a chronological order. In particular, the messages are typically transmitted and received in parallel. Furthermore, the response message will typically be received by the master anchor and the other anchors at the same time.

In one or more embodiments, the primary anchor further transmits an additional message to the node and to the secondary anchor, wherein said additional message is used for compensating the clock drift occurring between the primary anchor, the secondary anchor and the node. Thereby, the accuracy of the localization may be further increased. In particular, the clock drift may be measured by comparing the transmission times of consecutive messages on the initiator side (e.g., of the poll message and the additional message transmitted by the primary anchor) with the transmission times on the responder side (i.e., on the side of the node and the secondary anchor). Note that the clock drift may also be referred as a frequency offset. Once the relative clock frequency offset is estimated in this way, it may be used in an equation for measuring the distance. In a practical implementation, the communication network is an ultra-wideband communication network. The use of the ultra-wideband technology for localizing nodes results in a high accuracy of the localization. Furthermore, in a practical implementation, the timing information comprises timestamps. The use of timestamps facilitates the calculation of the position of the node. Furthermore, in one or more embodiments, the timing information is transmitted to the processing unit through said communication network or through a further communication network. More specifically, the processing unit should receive the timing information from the primary anchor, secondary anchor and node, in order to perform the aforementioned calculation. This timing information may either be transmitted in-band (i.e., through the same communication network) or out-of-band (i.e., through another communication network). The in-band transmission of timing information obviates the need for establishing an additional communication network, while the out-of-band transmission of timing information reduces the burden on the communication network through which the localization operations are performed. In a practical implementation, the further communication network is a ZigBee network, a Bluetooth low energy network, or a Wi-Fi network. It is noted that the location of the processing unit depends on the implementation of the localization system. For example, in a typical implementation, the processing unit may reside in a localizing device or controller with is operatively coupled to the primary anchor and the secondary anchor. Alternatively, the processing unit may be embedded in the primary anchor. Thus, in one or more embodiments, the primary anchor comprises the processing unit. This results in a practical implementation, since a separate processing unit is not needed.

Figure 4:
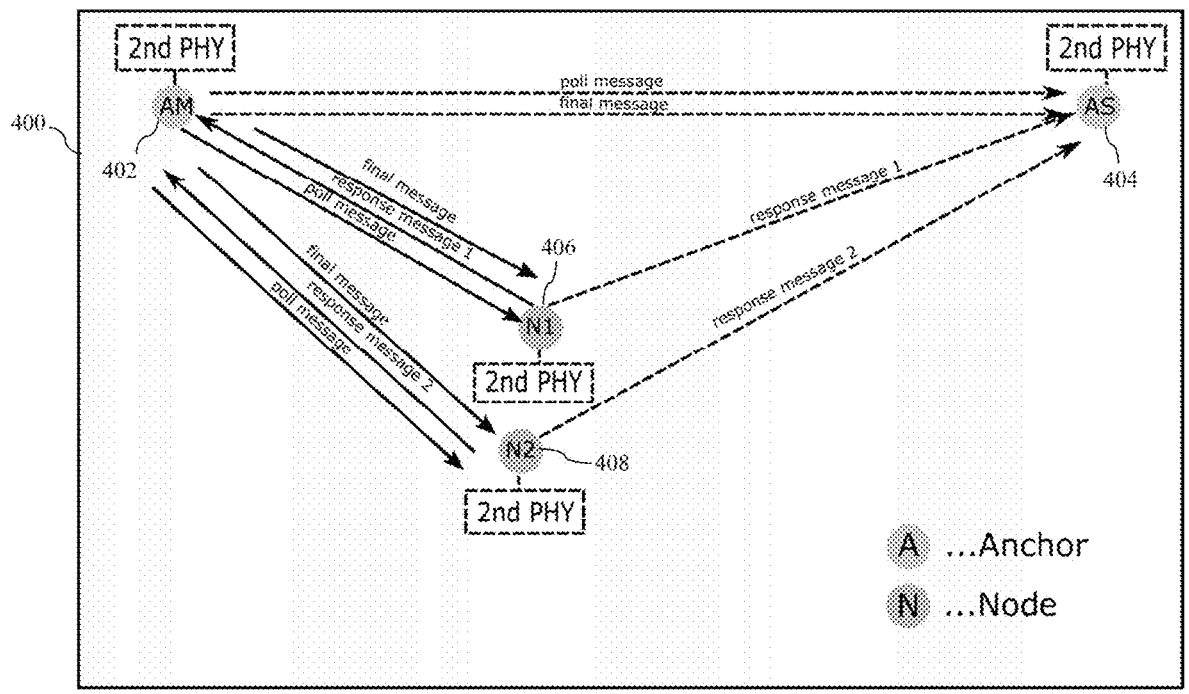
FIG. 4 shows an illustrative embodiment of a communication network.

FIG. 4 shows an illustrative embodiment of a communication network 400. The communication network 400 comprises a primary anchor 402, a secondary anchor 404, a first node 406 that should be localized, and a second node 408 that should be localized. In this embodiment, the communication network 400 is a UWB communication network. In particular, the message exchange is shown between two anchors 402, 404 and two nodes 406, 408. It is noted that the presently disclosed method may be regarded as a semi-passive solution in the sense that only the primary anchor 402 and the nodes 406, 408 may have an active communication link. The secondary anchor 404 merely listens to the exchanged messages and stores the corresponding timestamps. The arrows with a dashed line represent the frames that are sniffed by the secondary anchor 404. Furthermore, a further communication network—referred to as a second physical layer channel (PHY)—may be set up between the two anchors 402, 404 and two nodes 406, 408, in order to exchange data related to the localization and to administer the devices. Thereby, the number of number of messages that need to be transmitted over the UWB channel is reduced. It is noted that the final message is an additional message of the kind set forth, i.e. a message that is used for compensating the clock drift occurring between the primary anchor 402, the secondary anchor 404 and the nodes 406, 408. The processing unit may be embedded in the primary anchor 402 or in a separate localizing device or controller (not shown), which is operatively coupled to the primar anchor 402 and the secondary anchor 404.

Figure 5:
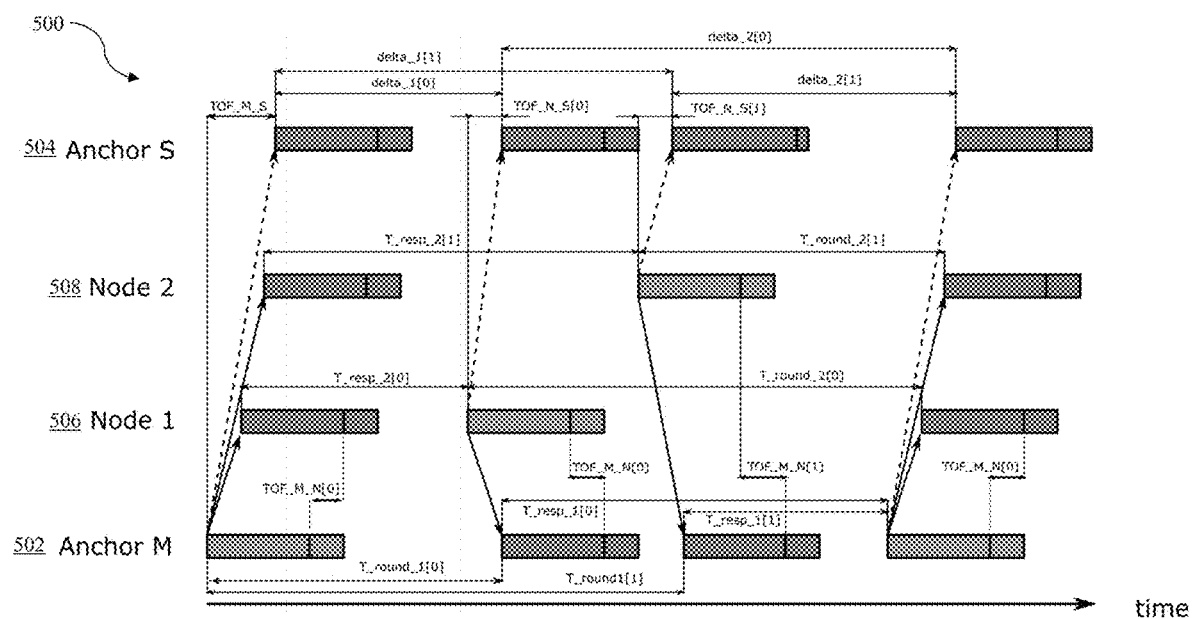
FIG. 5 shows an illustrative embodiment of a timing diagram.

FIG. 5 shows an illustrative embodiment of a timing diagram 500 of the message exchange between a primary anchor 502, a secondary anchor 504 and two nodes 506, 508 that should be localized. In particular, a message timing diagram is shown for the exchange of messages in the communication network shown in FIG. 4. This message diagram shows only the ranging messages that are required for measuring the timestamps needed for calculating the distances between the devices. The exchange of the distances and the timestamps may either be carried out in-band using data messages or out-of-band, for example through the second PHY.

The Time-of-Flight (TOF) calculation may be performed using the poll message and the final message for compensating the clock drift, as shown in the equations below. All the delta timestamps called "delta_1[i]" may be measured on the secondary anchors. It is noted that "i" is an iterator for the node index. Thus, for node 406 i equals 0 and for node 408 i equals 1. The round trip and response times that are measured at the active anchor and node side are called "T_resp_1[i]", "T_resp_2[i]", "T_round_1[i]" and "T_resp_1[i]", where the index "i" is also used for numbering the nodes.

$$TOF_{M-S} + delta_1[0] - TOF_{M-N}[0] - T_{resp2}[0] = TOF_{N-S}[0] \quad \text{(Eq. 1)}$$

$$delta_1[0] = delta_{1_{measured}}[0] \cdot k_{drift_S} \quad \text{(Eq. 2)}$$

$$T_{round1}[0] = T_{round1_{measured}}[0] \cdot k_{drift_M} \quad \text{(Eq. 3)}$$

$$T_{resp2}[0] = T_{resp2_{measured}}[0] \cdot k_{drift_N}[0] \quad \text{(Eq. 4)}$$

$$TOF_{M-N}[0] = \frac{T_{round1_{measured}}[0] \cdot T_{round2_{measured}}[0] - T_{resp1_{measured}}[0] \cdot T_{resp2_{measured}}[0]}{T_{round1_{measured}}[0] + T_{round1_{measured}}[0] + T_{resp1_{measured}}[0] + T_{resp2_{measured}}[0]} \quad \text{(Eq. 5)}$$

$$k_{drift_N}[0] + k_{drift_M} = 2 \quad \text{(Eq. 6)}$$

$$T_{round1}[0] = T_{resp2}[0] + 2 \cdot TOF_{M-N}[0] \quad \text{(Eq. 7)}$$

$$T_{round2}[0] = T_{resp1}[0] + 2 \cdot TOF_{M-N}[0] \quad \text{(Eq. 8)}$$

$$T_{resp2}[0] = \frac{T_{resp2_{measured}}[0] + T_{round1_{measured}}[0] - 2 \cdot TOF_{M-N}[0]}{2} \quad \text{(Eq. 9)}$$

$$T_{resp1}[0] = \frac{T_{resp1_{measured}}[0] + T_{round2_{measured}}[0] - 2 \cdot TOF_{M-N}[0]}{2} \quad \text{(Eq. 10)}$$

$$delta_1[0] + delta_2[0] = T_{resp1}[0] + T_{resp2}[0] + 2 \cdot TOF_{M-N}[0] \quad \text{(Eq. 11)}$$

$$(delta_{1_{measured}}[0] + delta_{2_{measured}}[0]) \cdot k_{drift_S} = T_{resp1}[0] + T_{resp2}[0] + 2 \cdot TOF_{M-N}[0] \quad \text{(Eq. 12)}$$

$$k_{drift_S} = \frac{\frac{T_{resp2_{measured}}[0] + T_{round1_{measured}}[0]}{2} + \frac{T_{resp1_{measured}}[0] + T_{round2_{measured}}[0]}{2}}{(delta_{1_{measured}}[0] + delta_{2_{measured}}[0])} \quad \text{(Eq. 13)}$$

$$TOF_{M-S} + delta_{1_{measured}}[0] \cdot k_{drift_S} - TOF_{M-N}[0] - T_{resp2}[0] = TOF_{N-S}[0] \quad \text{(Eq. 14)}$$

Equation 1 may be set up based on the timing diagram. This equation only holds if all devices are running on the same clock. If there is a clock frequency offset between the devices measuring the timestamps the calculated TOF called "TOF_N_S[i]" may have a large error. The equations 2, 3 and 4 show how a clock frequency scaling factor called "k_drift" may be used for compensating the frequency offset. For example, if a device frequency is increased by 10 parts per million (ppm), then the result of a timestamp measurement will be scaled down by 1/(1+10 ppm). Thus, for compensating this clock drift, the measured timespan (e.g. "delta1_measured") needs to be multiplied by the scaling factor, which is in this case 1+10 ppm. The clock drift compensation may work in the same way for all measured timespans. The TOF between the primary anchor and the node may be calculated by applying equation 5 which is the double-sided two-way ranging (DS-TWR) equation. The DS-TWR equation assumes that the average clock frequency, combining the primary anchor frequency and the node frequency, is the frequency of an ideal clock. This implies that the sum of the primary anchor and secondary anchor clock frequency scaling factor is two. The corresponding clock frequency scaling relation is shown in equation 6.

For the calculation of the TOF between the secondary anchor and the nodes, the average between the primary anchor and the node clock may be used as a reference. Basically, any device clock (e.g., the primary anchor clock) may be used as a reference; it is only relevant that a device transmits two messages as a reference for enabling the calculation of the clock frequency scaling factors. Equations 7 to 10 show how the ideal round trip and response times may be calculated by using the same reference as the DS-TWR. Equation 11 shows the relation between ideal delta timestamps measured on the secondary anchor side and the ideal measured roundtrip and response times. By combining equation 11 with equation 2, equation 12 may be set up and formed to equation 13. Now by inserting the clock drift compensated timespans and the clock drift compensation factor calculated by using equation 1-13 into equation 14, the clock drift compensated TOF may be calculated. Also, a different clock drift compensation method may be applied, for example using a carrier frequency offset as an indication, but then the ranging accuracy strongly depends on the carrier frequency offset measurement, which might complicate long ranging sequences. Thus, using the carrier frequency offset might only be useful for short ranging rounds. Since there should be an active communication session between the primary anchor and the node, a signal should be able to propagate from the active anchor (i.e., the primary anchor) to the node and vice versa.

In one or more embodiments, the method further comprises determining the position of a plurality of nodes in the communication network, and selecting an additional primary anchor if at least one of said nodes has not received the poll message, wherein the additional primary anchor transmits a further poll message to the nodes and to the secondary anchor. In this way, a node which has not received the first poll message may still be localized. Thus, the number of nodes that can be localized is further increased. In one or more embodiments, the nodes transmit response messages to the poll message and to the further poll message, wherein said response messages are transmitted in a predetermined order. In this way, the risk of collisions between the different response messages may be reduced, which in turn increases the accuracy of the localization. In a practical implementation, said predetermined order is a preconfigured order. Alternatively, or in addition, data indicative of said predetermined order may be communicated to the nodes through a further communication network, in particular a ZigBee network, a Bluetooth low energy network, or a Wi-Fi network. In this way, the flexibility of the method may be increased. Furthermore, in one or more embodiments, the node is kept in a low-power state when no messages are expected to be received. In this way, the power consumption of the node is reduced. In particular, the node is typically kept in the low-power mode (e.g., a sleep mode) until a message is received. In a practical implementation, the localization system further comprises a controller, wherein said controller controls the primary anchor and the secondary anchor through a further communication network, in particular a ZigBee network, a Bluetooth low energy network, or a Wi-Fi network. By controlling the anchors through a further communication network, the burden on the communication network through which the localization operations are performed is reduced.

Figure 6:
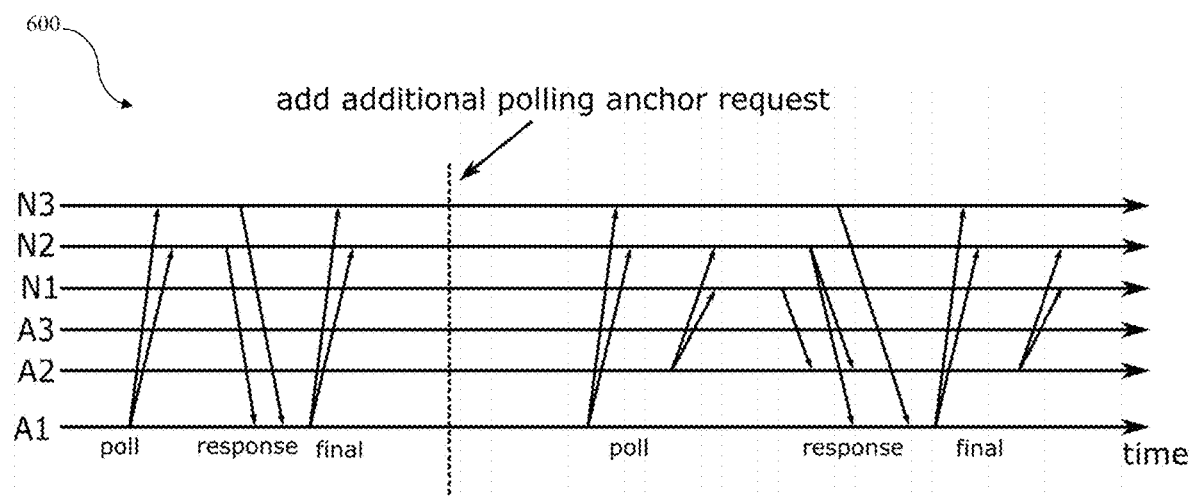
FIG. 6 shows an illustrative embodiment of a message exchange sequence.

FIG. 6 shows an illustrative embodiment of a message exchange sequence 600. In particular, an example is shown of how multiple primary anchors may be used. First only anchor A1 sends a poll message, which is only received by the nodes N2 and N3. Since node N1 is not receiving any poll message, this is reported to the system either in-band in a collision-based communication phase or out-of-band using a second PHY. Then the localization system is aware that no UWB communication is possible between N1 and A1, and it may select an additional primary anchor to transmit a poll message (e.g., anchor A2 in the shown example). Node N2 may receive the poll message from anchor A2, so that ranging is enabled. Since anchor A2 cannot be heard by node N3, both anchors A1 and A2 should send the poll message and the final message. Alternatively, if A2 would be able to communicate with all the nodes, then anchor A1 would not need to continue sending its poll message.

Figure 7:
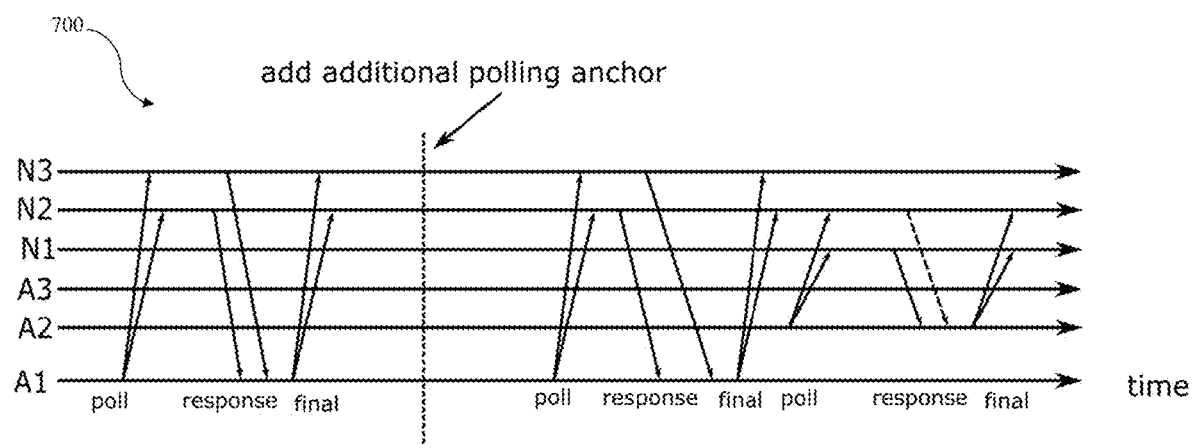
FIG. 7 shows another illustrative embodiment of a message exchange sequence.

FIG. 7 shows another illustrative embodiment of a message exchange sequence 700. In particular, in this example a different protocol approach is applied to a communication network of the kind set forth. According to this approach, the anchor A2 sends its poll message after the final message of anchor A1. The dashed line that represents the response of node N2 is an optional message, because this node has already responded to the poll message of A1.

Both ranging sequences do have the same message count if the response message with the dashed line is not sent. This implies that both sequences require the same channel capacity. The order of the response messages may either be preconfigured or be communicated out-of-band. In particular, it is useful to have a fixed order and fixed transmission times, in order to avoid collisions. Advantageously, the poll messages transmitted by the primary anchors may be used for a device synchronization, which is the basis of a predetermined anti-collision mechanism. In any case, in order to keep the channel utilization as low as possible an anchor that can communicate on the UWB channel with all the nodes should be selected as a primary anchor, provided that such an anchor is available. In that case, only one poll message and one final message need to be transmitted. If there is no anchor available that can communicate with all nodes, the smallest set of anchors should be selected that is able to communicate with all nodes, in order to keep the number of messages as low as possible while still enabling a localization of all the nodes.

The calculation of the TOF for the ranging sequences shown in FIG. 6 and FIG. 7 may be carried out in an analogous way as described for FIG. 5 and in the equations 1-14. An advantage of the presently disclosed method may be that the number of active anchors and the selected active anchors may be dynamically changed depending on the RF channel quality between the anchors and the nodes. Additionally, the power consumption on the node side may be kept low by only powering up the receiver when a poll message or a final message is expected, because the nodes know when a poll or final message will be transmitted.

Figure 8:
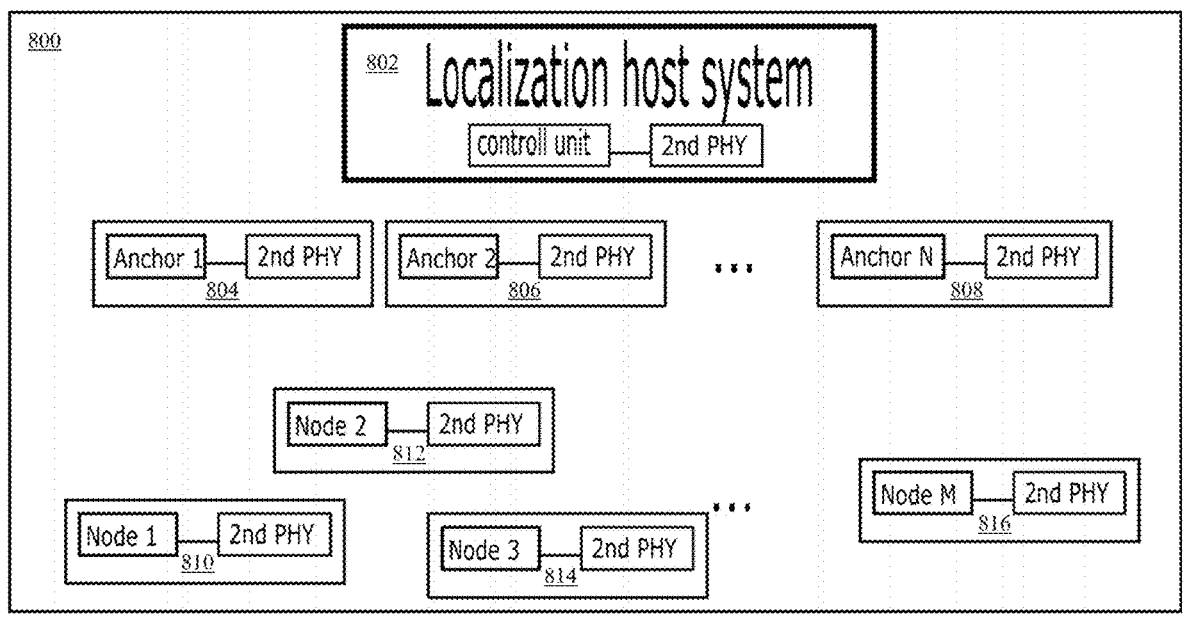
FIG. 8 shows another illustrative embodiment of a communication network.

FIG. 8 shows another illustrative embodiment of a communication network 800. The communication network 800 comprises a localization host system 802, a plurality of anchors 804, 806, 808, and a plurality of nodes 810, 812, 814, 816 that should be localized. In this example, the communication network 800 is a UWB communication network. In addition, the localization host system 802, anchors 804, 806, 808, and nodes 810, 812, 814, 816 are coupled to each other through a further communication network (i.e., using a second PHY). The localization host system 802 comprises a control unit and a second PHY. Accordingly, the localization host system 802 is configured to control the anchors 804, 806, 808 using control messages transmitted over the second PHY. In this example, the localization host system 802 does not need to have a UWB interface, because it is capable of controlling every device via the second PHY. This has the advantage that no UWB communication is required for transmitting data messages, which means that the whole channel capacity can be used for the device localization. Alternatively, the devices may be controlled through the UWB communication network.

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 communication network
102 first anchor
104 second anchor
106 first node
108 second node
200 timing diagram
202 first anchor
204 second anchor
206 first node
208 second node
300 method for determining the position of a node
302 primary anchor transmits a poll message to node and secondary anchor
304 primary anchor receives a response message from the node
306 secondary anchor receives said poll message from the primary anchor and said response message from the node
308 processing unit calculates the position of the node using timing information of the poll message transmission by the primary anchor, of the poll message reception by the node and the secondary anchor, of the response message transmission by the node, and of the response message reception by the primary anchor and the secondary anchor
400 communication network
402 primary anchor
404 secondary anchor
406 first node
408 second node
500 timing diagram
502 primary anchor
504 secondary anchor
506 first node
508 second node
600 message exchange sequence
700 message exchange sequence
800 communication network
802 localization host system
804 first anchor
806 second anchor
808 Nth anchor
810 first node
812 second node
814 third node
816 Nth node

What is claimed is:

1. A method for determining the position of at least one node in a communication network, wherein the communication network comprises a localization system that includes a processing unit, a primary anchor and at least one secondary anchor, the method comprising:
    the primary anchor transmits a poll message to the node and to the secondary anchor;
    the primary anchor receives a response message from the node;
    the secondary anchor receives said poll message from the primary anchor and said response message from the node;
    the processing unit calculates the position of the node using position information and timing information, wherein said position information is position information of the primary anchor and of the secondary anchor, wherein said timing information is timing information of the poll message transmission by the primary anchor, of the poll message reception by the node and the secondary anchor, of the response message transmission by the node, and of the response message reception by the primary anchor and the secondary anchor, and wherein the node is kept in a low-power state when no messages are expected to be received.

2. The method of claim 1, wherein the primary anchor further transmits an additional message to the node and to the secondary anchor, wherein said additional message is used for compensating the clock drift occurring between the primary anchor, the secondary anchor and the node.

3. The method of claim 1, wherein the communication network is an ultra-wideband communication network.

4. The method of claim 1, wherein the timing information comprises timestamps.

5. The method of claim 1, wherein the timing information is transmitted to the processing unit through said communication network or through a further communication network, in particular through a ZigBee network, a Bluetooth low energy network, or a Wi-Fi network.

6. The method of claim 1, wherein the primary anchor comprises the processing unit.

7. The method of claim 1, comprising determining the position of a plurality of nodes in the communication network, wherein the method further comprises selecting an additional primary anchor if at least one of said nodes has not received the poll message, and wherein the additional primary anchor transmits a further poll message to the nodes and to the secondary anchor.

8. The method of claim 7, wherein the nodes transmit response messages to the poll message and to the further poll message, and wherein said response messages are transmitted in a predetermined order.

9. The method of claim 8, wherein said predetermined order is a preconfigured order.

10. The method of claim 8, wherein data indicative of said predetermined order is communicated to the nodes through a further communication network, in particular a ZigBee network, a Bluetooth low energy network, or a Wi-Fi network.

11. The method of claim 1, wherein the localization system further comprises a controller, and wherein said controller controls the primary anchor and the secondary anchor through a further communication network, in particular a ZigBee network, a Bluetooth low energy network, or a Wi-Fi network.

12. A non-transitory computer-readable medium comprising the computer program comprising executable instructions that, when executed, carry out or control a method for determining the position of at least one node in a communication network, wherein the communication network comprises a localization system that includes a processing unit, a primary anchor and at least one secondary anchor, the method comprising:
the primary anchor transmits a poll message to the node and to the secondary anchor;
the primary anchor receives a response message from the node;
the secondary anchor receives said poll message from the primary anchor and said response message from the node;
the processing unit calculates the position of the node using position information and timing information, wherein said position information is position information of the primary anchor and of the secondary anchor, wherein said timing information is timing information of the poll message transmission by the primary anchor, of the poll message reception by the node and the secondary anchor, of the response message transmission by the node, and of the response message reception by the primary anchor and the secondary anchor, wherein the node is kept in a low-power state when no messages are expected to be received.

13. A localization system for determining the position of at least one node in a communication network, the localization system including a processing unit, a primary anchor and at least one secondary anchor, wherein:
the primary anchor is configured to transmit a poll message to the node and to the secondary anchor;
the primary anchor is configured to receive a response message from the node;
the secondary anchor is configured to receive said poll message from the primary anchor and said response message from the node;
the processing unit is configured to calculate the position of the node using position information and timing information, wherein said position information is position information of the primary anchor and of the secondary anchor, wherein said timing information is timing information of the poll message transmission by the primary anchor, of the poll message reception by the node and the secondary anchor, of the response message transmission by the node, and of the response message reception by the primary anchor and the secondary anchor, and wherein the processing unit is further configured to determine the position of a plurality of nodes in the communication network and select an additional primary anchor if at least one of said nodes has not received the poll message.

14. The system of claim 13, wherein the primary anchor is further configured to transmit an additional message to the node and to the secondary anchor, wherein said additional message is used for compensating the clock drift occurring between the primary anchor, the secondary anchor and the node.

15. The system of claim 13, wherein the communication network is an ultra-wideband communication network.

16. The system of claim 13, wherein the communication network is configured for transmitting the network timing information to the processing unit.

17. The system of claim 13, wherein the additional primary anchor is configured to transmit a further poll message to the nodes and to the secondary anchor.

* * * * *